(12) United States Patent
Park

(10) Patent No.: US 10,752,077 B2
(45) Date of Patent: Aug. 25, 2020

(54) CLUTCH APPARATUS FOR STABILIZER

(71) Applicant: HYUNDAI MOBIS CO., LTD., Seoul (KR)

(72) Inventor: Jun Sung Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 148 days.

(21) Appl. No.: 16/013,947

(22) Filed: Jun. 21, 2018

(65) Prior Publication Data

US 2019/0184784 A1   Jun. 20, 2019

(30) Foreign Application Priority Data

Dec. 19, 2017   (KR) .......................... 10-2017-0175092

(51) Int. Cl.
  *B60G 21/055*  (2006.01)
  *F16D 41/06*  (2006.01)

(52) U.S. Cl.
  CPC ......... *B60G 21/0556* (2013.01); *F16D 41/06* (2013.01); *B60G 2202/12* (2013.01); *B60G 2202/43* (2013.01); *B60G 2202/442* (2013.01); *B60G 2204/416* (2013.01); *B60G 2204/4604* (2013.01); *B60G 2206/427* (2013.01)

(58) Field of Classification Search
  CPC .............. B60G 21/055; B60G 21/0556; B60G 2202/12; B60G 2202/43; B60G 2202/442; B60G 2204/416; B60G 2204/4604; B60G 2206/427; F16D 41/06; F16D 41/064; F16D 2041/0646; F16D 11/14; F16D 2023/123
  See application file for complete search history.

(56) References Cited

FOREIGN PATENT DOCUMENTS

JP  2005-161880  6/2005
JP  3126971  11/2006

*Primary Examiner* — Huan Le
(74) *Attorney, Agent, or Firm* — H.C. Park & Associates, PLC

(57) ABSTRACT

A clutch apparatus for a stabilizer may include: an inner race fixed to a first transmission bar, with a first guide recess part formed in a longitudinal direction in an outer surface of the first transmission bar; a housing fixed to a second transmission bar and installed in a shape enclosing the outer surface of the inner race, with a second guide recess part formed in the housing at a position facing the first guide recess part; a ball disposed between the inner race and the housing and having opposite sides respectively inserted into and retained in the first guide recess part and the second guide recess part; and a driver disposed inside the housing and configured to move the ball along the first guide recess part and the second groove and control power transmission between the inner race and the housing.

10 Claims, 13 Drawing Sheets

CLUTCH APPARATUS FOR STABILIZER

CROSS-REFERENCES TO RELATED APPLICATIONS

This application claims from and the benefit of Korean Patent Application No. 10-2017-0175092, filed on Dec. 19, 2017, which is hereby incorporated by reference for all purposes as if fully set forth therein.

BACKGROUND

Field

Exemplary embodiments relate to a clutch apparatus for a stabilizer, and more particularly, to a clutch apparatus for a stabilizer which has a power transmitting or interrupting clutch structure capable of tracing an original point and then performing an engagement operation from the original point.

Discussion of the Background

In general, a stabilizer is installed in a vehicle so as to minimize a left and right wobbling phenomenon of the vehicle which occurs when the vehicle moves on a road having an uneven surface or turns to the left or the right.

In a conventional art, a stabilizer bar formed of single material is installed in a lateral direction of a vehicle body and functions to stabilize the position of the vehicle body by mitigating, using roll stiffness of the stabilizer bar itself, a rolling phenomenon of the vehicle body which occurs due to variation in relative operational positions of left and right suspension systems while the vehicle moves.

Such a stabilizer bar is manufactured by cutting a single round bar or a pipe to have an appropriate length, processing the cut material to have shape and stiffness required as the stabilizer bar, and then performing a heat treatment process, a shot peening process, a painting process, and so forth.

The stabilizer bar manufactured using the single material is a passive stabilizer bar and has advantages of facilitating a manufacturing process and reducing production cost, but is problematic in that, as described above, because its own inherent roll stiffness is used to control the rolling phenomenon of the vehicle body, it is difficult to effectively mitigate various types of rolling phenomenon which occur when the vehicle moves.

Consequently, recently, use of an active rotary type stabilizer employing an actuator to make it possible to adjust the roll stiffness of a stabilizer bar depending on the situation has been increased.

A rolling stabilizer for a vehicle is configured such that two half stabilizer bars are coupled to respective opposite ends of an actuator. The rolling stabilizer functions to increase the stability of the vehicle by reducing roll of the vehicle when turning, or control the lateral position of the vehicle by distributing roll stiffness of front wheels and rear wheels. Furthermore, when the vehicle moves straight ahead, the stiffness of the stabilizer bar is reduced so that transmission of shocks from a road can be reduced, whereby ride comfort may be improved.

In the case where a clutch-type actuator is used as the actuator of the rolling stabilizer, gear teeth are formed on a locking part coupled to the two half stabilizer bars, and transmission of power is embodied by engagement of the gear teeth. However, if the half stabilizer bars that are in a twisted state engage with the locking part, there are problems in that it is difficult to perform an operation of tracing an original point for an engagement operation, or friction between parts increases, whereby the durability of the parts is reduced, or operating noise is increased. Therefore, there is a need to improve the conventional configuration.

The above information disclosed in this Background section is only for enhancement of understanding of the background of the invention and, therefore, it may contain information that does not constitute prior art.

SUMMARY

Exemplary embodiments of the present invention are directed to a clutch apparatus for a stabilizer which has a power transmitting or interrupting clutch structure capable of tracing an original point and then performing an engagement operation from the original point.

In one embodiment, a clutch apparatus for a stabilizer may include: an inner race fixed to a first transmission bar, with a first guide recess part formed in a longitudinal direction in an outer surface of the first transmission bar; a housing fixed to a second transmission bar and installed in a shape enclosing the outer surface of the inner race, with a second guide recess part formed in the housing at a position facing the first guide recess part; a ball disposed between the inner race and the housing and having opposite sides respectively inserted into and retained in the first guide recess part and the second guide recess part; and a driver disposed inside the housing and configured to move the ball along the first guide recess part and the second groove and control power transmission between the inner race and the housing.

The inner race may include an inner body installed in a shape enclosing an end of the first transmission bar. The first guide recess part formed in the outer surface of the inner body may define a linear depression extending along a longitudinal direction of the inner body.

The first guide recess part may include a plurality of first guide recess parts arranged along a circumference of the outer surface of the inner body.

The housing may include: a fixing body fixed to the second transmission bar; and an extension body extending from the fixing body and installed in a shape enclosing the inner race, with the second guide recess part formed in an inner surface of the extension body.

The second guide recess part may include: a first groove defining a linear depression at a position facing the first guide recess part; and a second groove connected with the first groove and defining a fan-shaped depression. While the ball is locked in the first groove and the first guide recess part, power transmission between the inner race and the housing may be performed through the ball.

Furthermore, a magnitude of force for moving the ball may vary depending on a shape of a depression side-surface of the second groove.

The depression side-surface of the second groove may protrude in a convex shape toward an inside of the housing.

The depression side-surface of the second groove may be formed in a concave shape toward an inside of the housing.

The driver may include: a motor fixed in the fixing body; a ball screw coupled to an output shaft of the motor and configured to be rotated by operation of the motor; a ball nut configured to be locked to the inner surface of the extension body so that the ball nut is restrained from rotating, the ball nut engaging with the ball screw and linearly moving; and a cage extending from the ball nut and disposed between the extension body and the inner race, and including a guide hole into which the ball is inserted.

The guide hole may have a slot shape and include a plurality of guide holes arranged in a circumferential direction of the cage.

The driver may further include a compressing member disposed inside the housing and configured to elastically compress the ball nut toward the inner race.

In a clutch apparatus for a stabilizer in accordance with the present invention, a clutch operation in which a ball moves from a second groove having a fan shape to a first groove having a linear shape to trace an original point and then enter an engaged state can be rapidly and easily performed.

Furthermore, when the vehicle moves straight ahead, the ball moves to the second groove so that power transmission between a housing and an inner race is interrupted. When the vehicle turns, the ball moves to the first groove so that the power transmission between the housing and the inner race is allowed. Therefore, ride comfort and turning stability can be enhanced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Hereinafter, a clutch apparatus for a stabilizer in accordance with embodiments of the invention will be described in detail with reference to the accompanying drawings. It should be noted that the drawings are not to precise scale and may be exaggerated in thickness of lines or sizes of components for descriptive convenience and clarity only. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Furthermore, the terms as used herein are defined by taking functions of the invention into account and can be changed according to the custom or intention of users or operators. Therefore, definition of the terms should be made according to the overall disclosures set forth herein.

Figure 1:
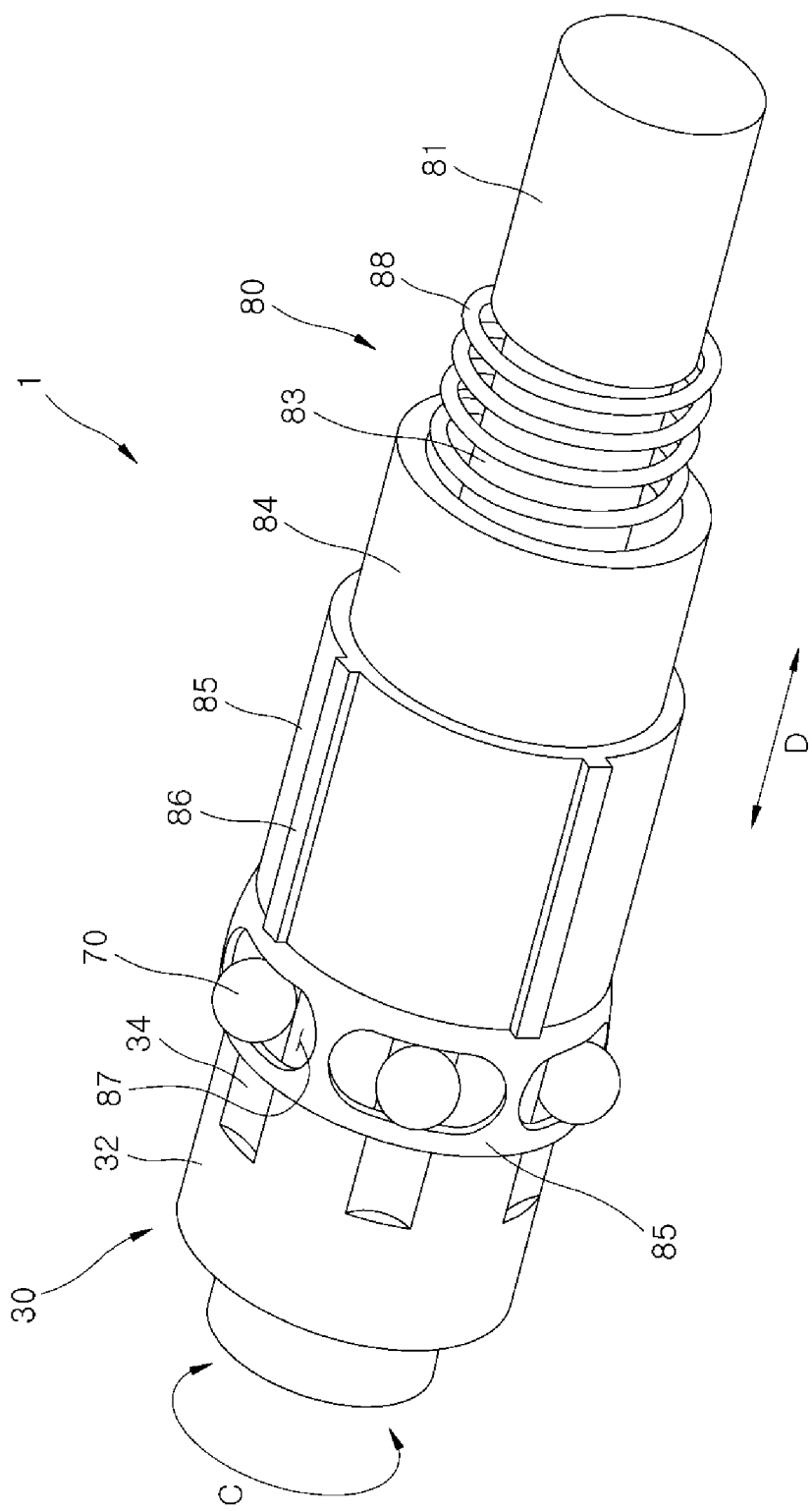
FIG. 1 is a perspective view illustrating balls which are moved by a cage from first sides of first guide recess parts to second sides in accordance with an embodiment of the present invention.
Figure 2:
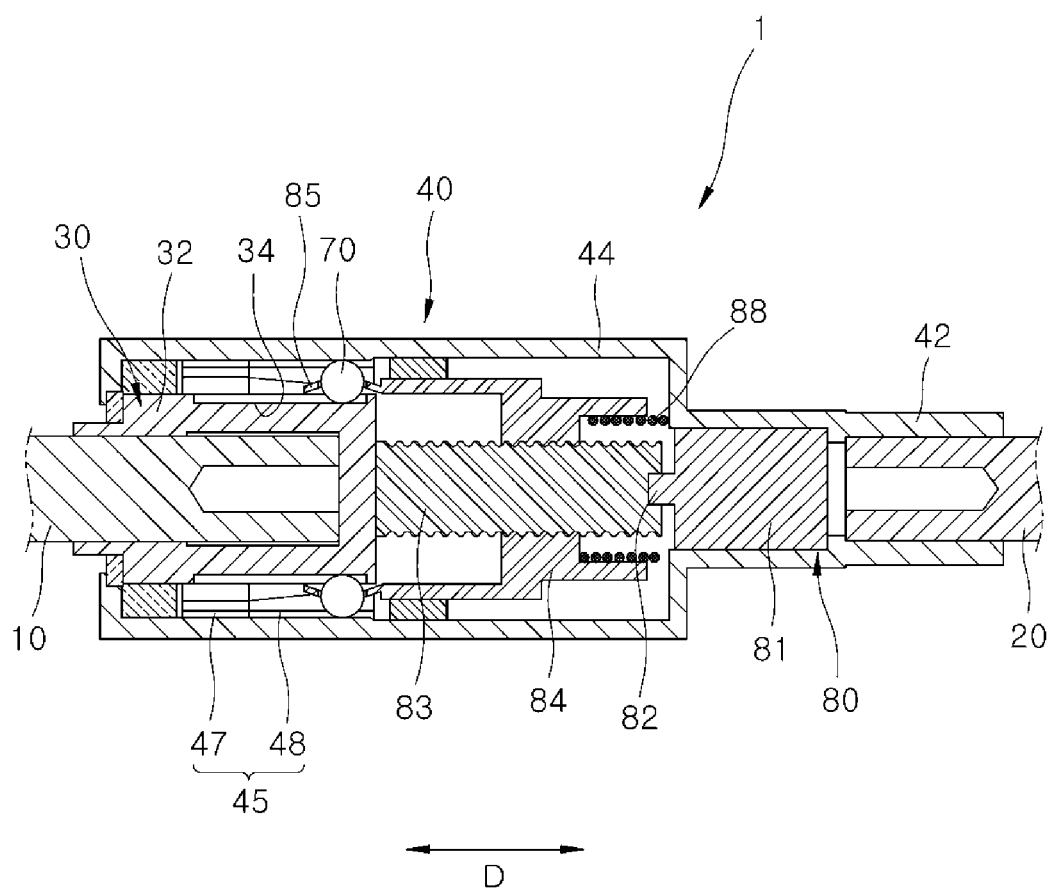
FIG. 2 is a front sectional view illustrating the balls moved to second grooves in accordance with an embodiment of the present invention.
Figure 3:
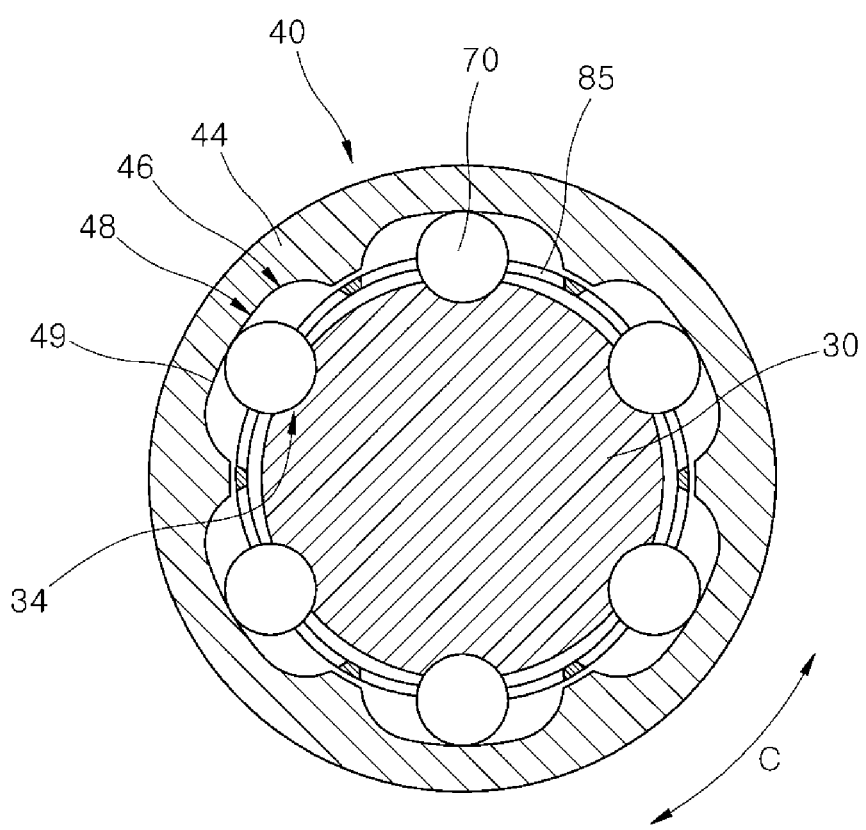
FIG. 3 is a side sectional view illustrating the balls disposed in the second grooves in accordance with an embodiment of the present invention.
Figure 4:
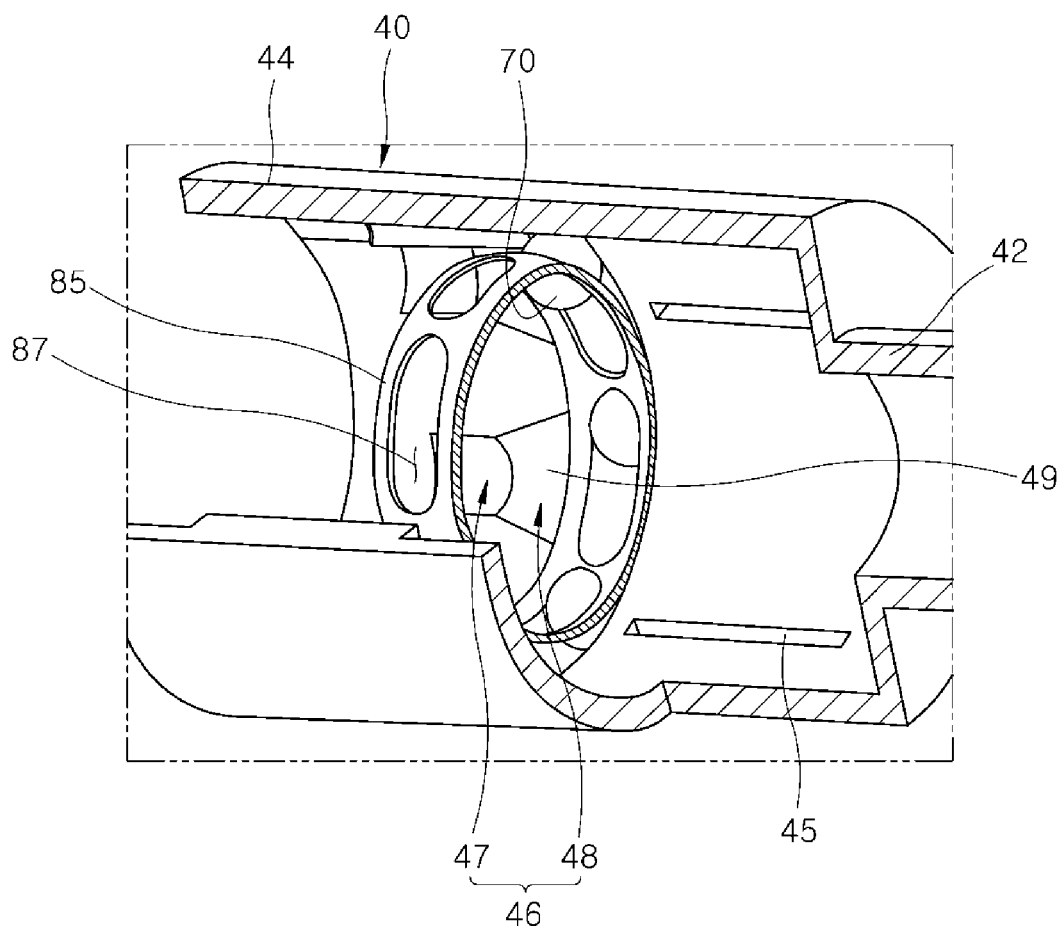
FIG. 4 is a perspective view illustrating a state in which the balls have been disposed in the second grooves and an angle difference has occurred, in accordance with an embodiment of the present invention.
Figure 5:
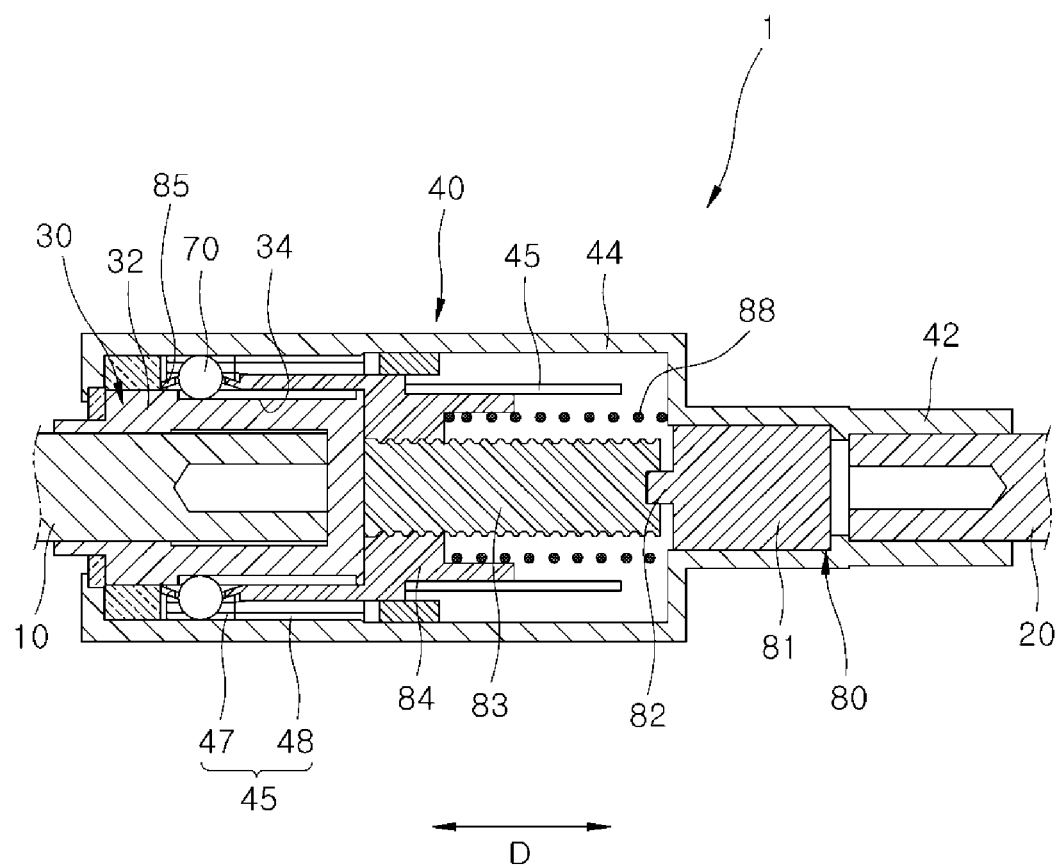
FIG. 5 is a front sectional view illustrating the balls moved to first grooves in accordance with an embodiment of the present invention.
Figure 6:
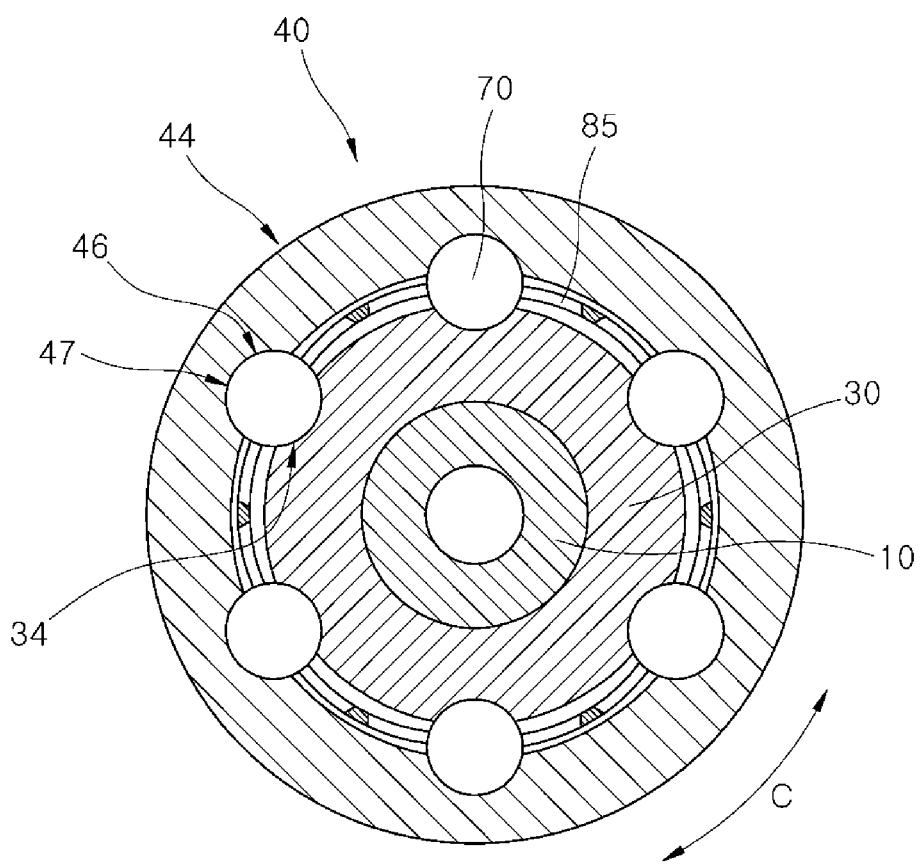
FIG. 6 is a side sectional view illustrating the balls disposed in the first grooves in accordance with an embodiment of the present invention.
Figure 7:
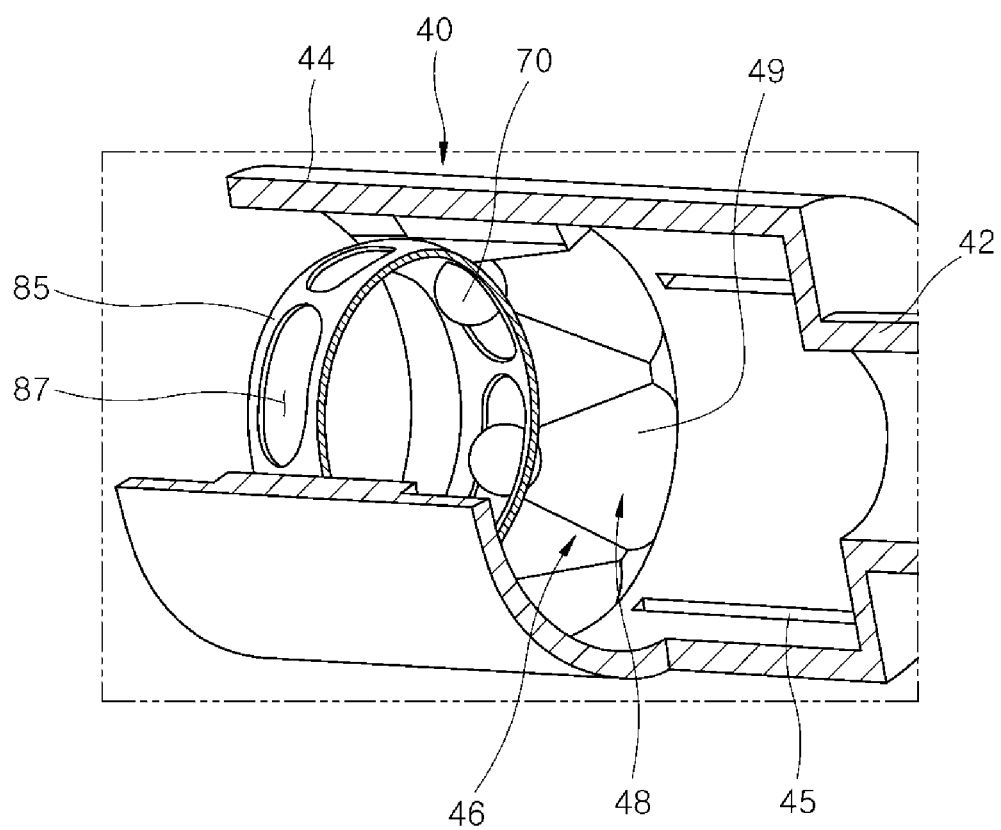
FIG. 7 is a perspective view illustrating the balls disposed in the first grooves in accordance with an embodiment of the present invention.
Figure 8:
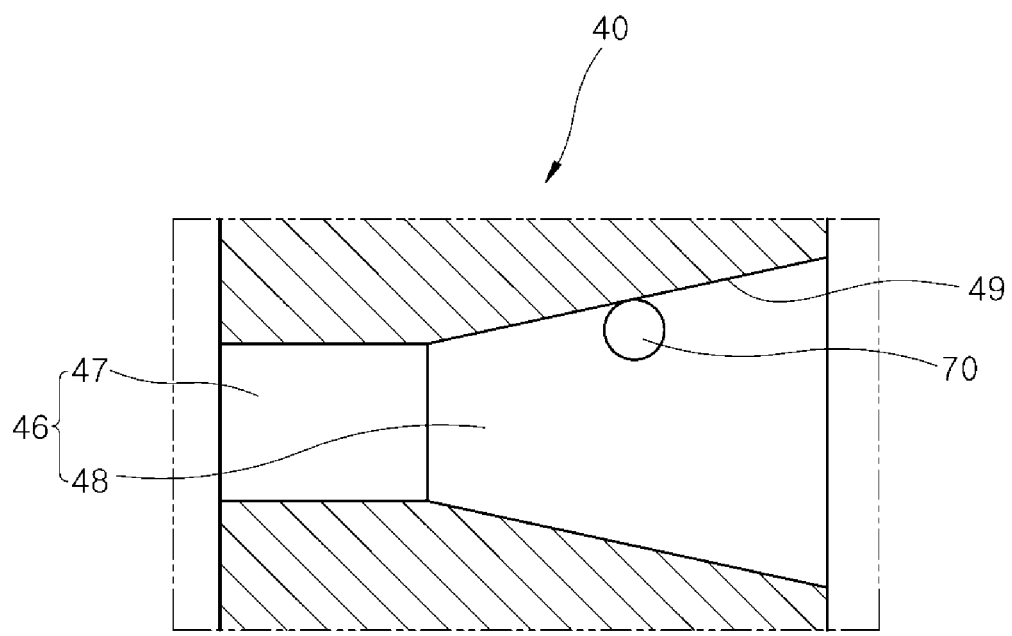
FIG. 8 is a diagram illustrating the shape of a second groove in accordance with an embodiment of the present invention.
Figure 9:
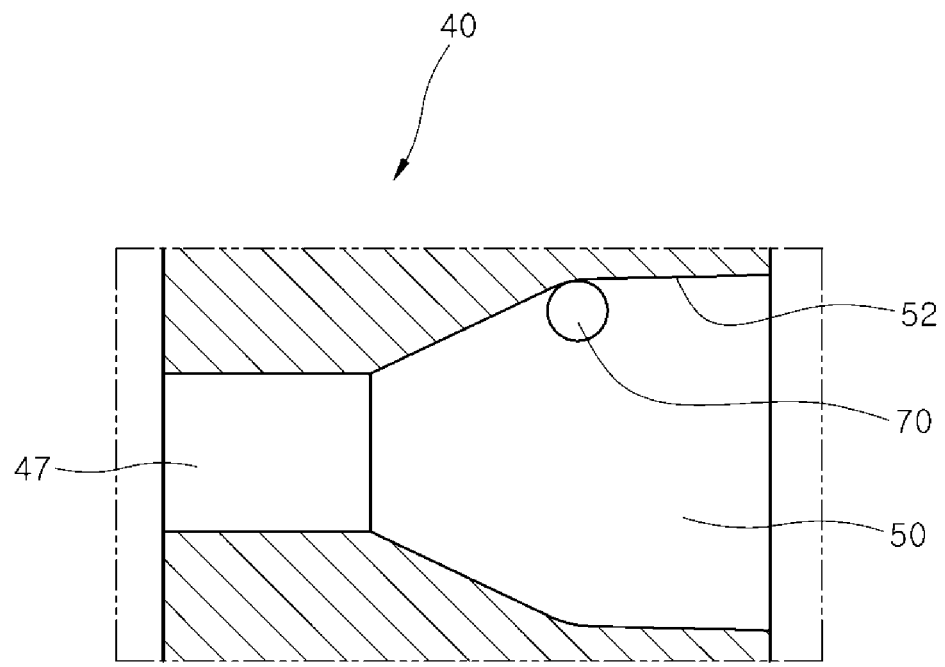
FIG. 9 is a diagram illustrating the shape of a second groove in another embodiment of the present invention.
Figure 10:
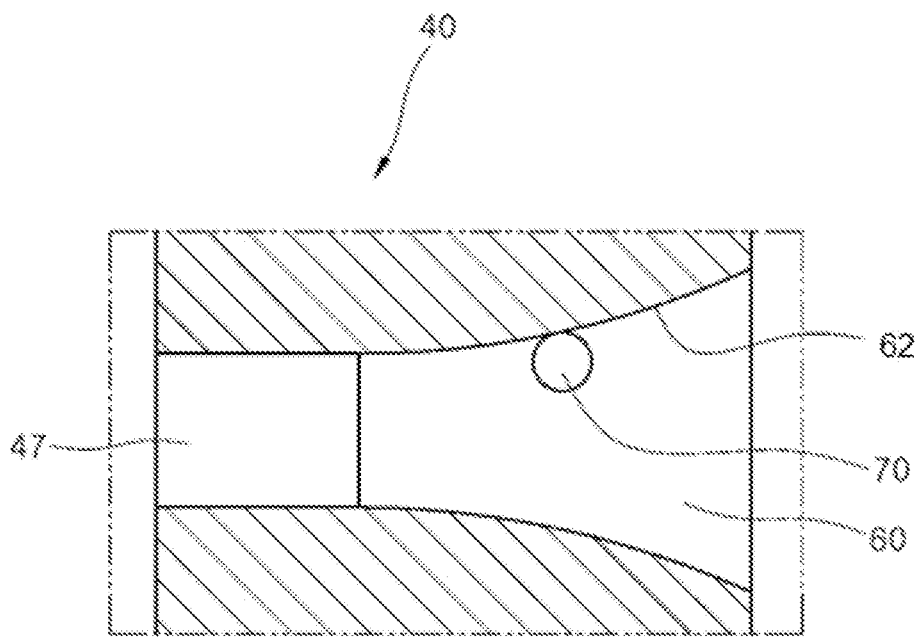
FIG. 10 is a diagram illustrating the shape of a second groove in accordance with yet another embodiment of the present invention.
Figure 11:
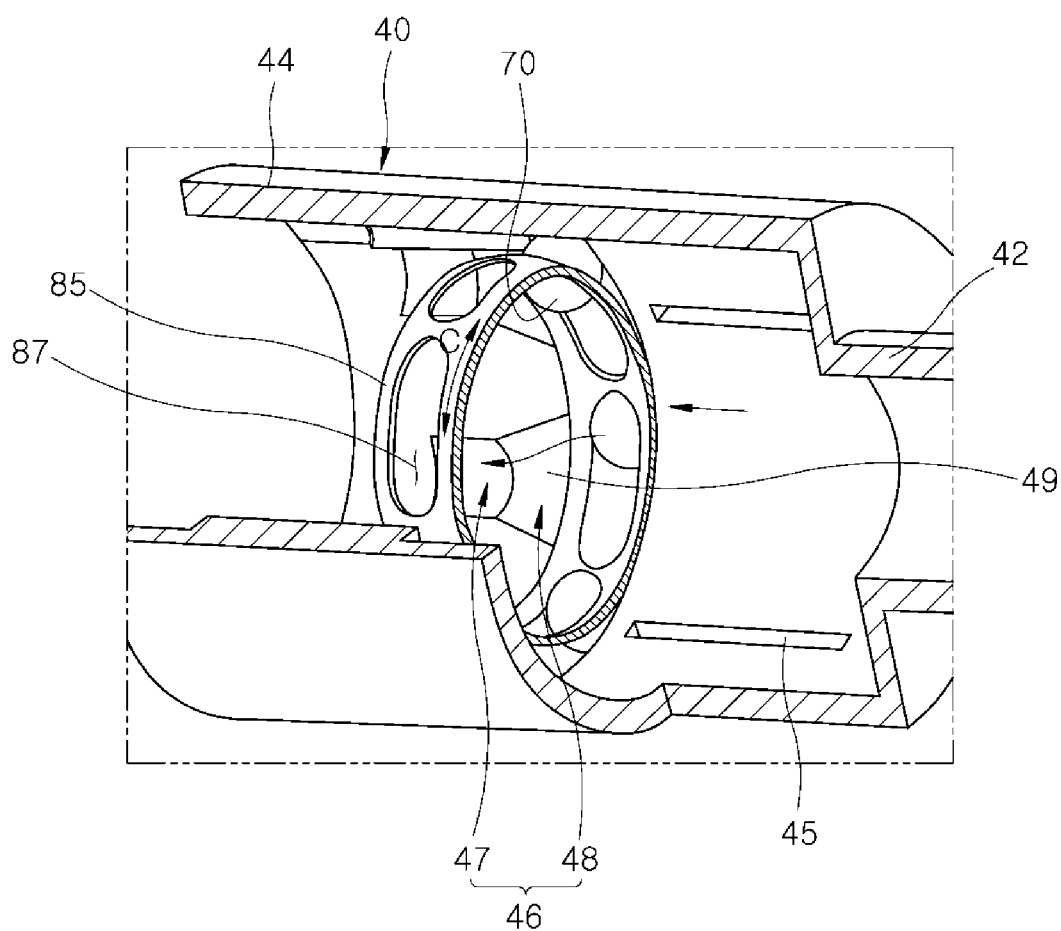
FIG. 11 is a perspective view illustrating an operation in which the balls move from the second grooves to the first grooves, trace an original point, and then enter an engaged state in accordance with an embodiment of the present invention.
Figure 12:
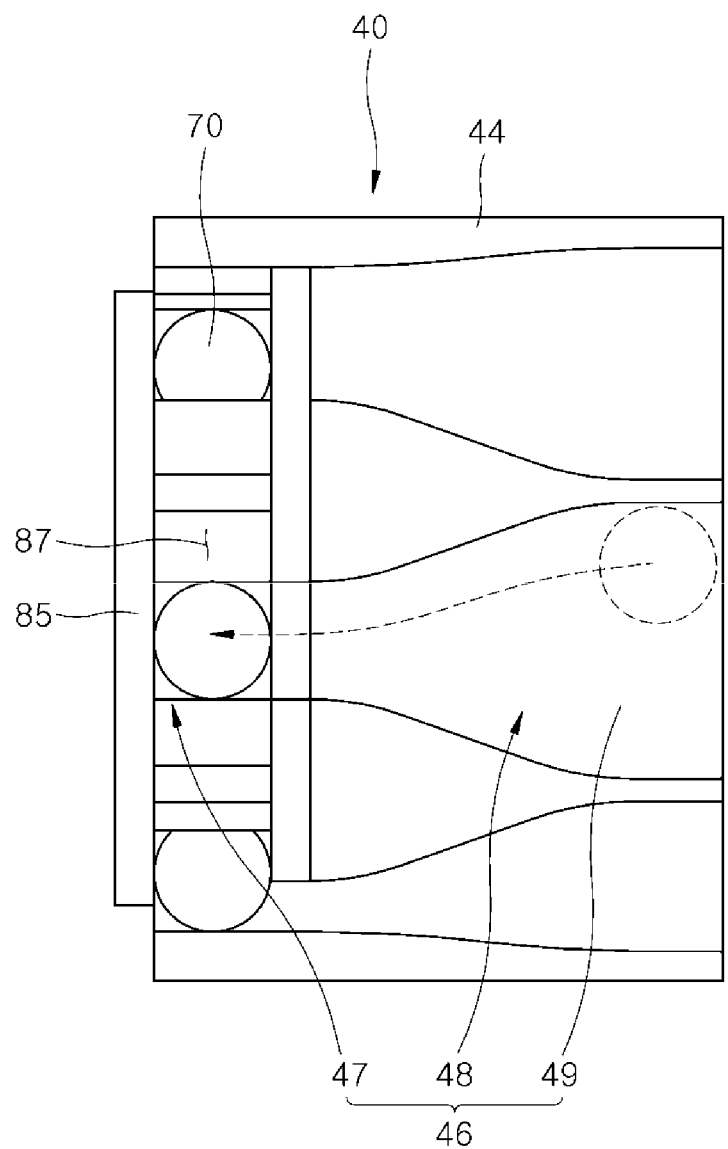
FIG. 12 is a front view illustrating the operation in which the balls move from the second grooves to the first grooves, trace the original point, and then enter the engaged state in accordance with an embodiment of the present invention.
Figure 13:
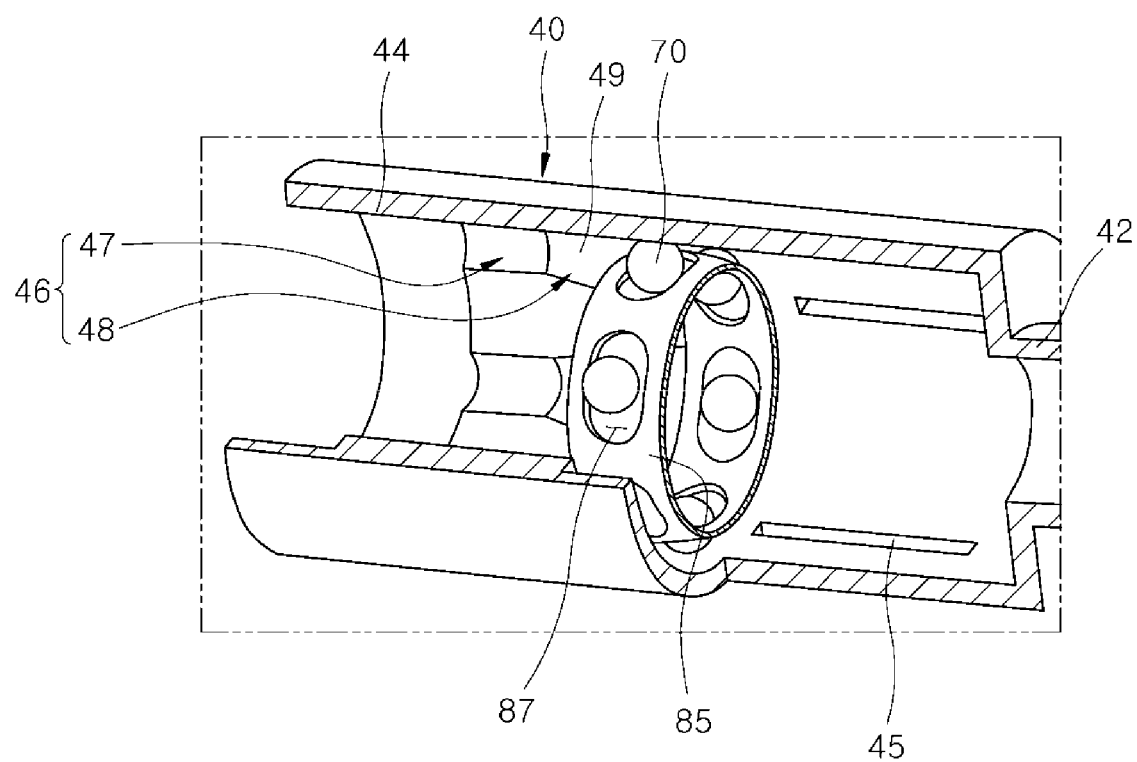
FIG. 13 is a perspective view illustrating the balls moved to respective outer sides of the second grooves in accordance with an embodiment of the present invention.

FIG. 1 is a perspective view illustrating balls which are moved by a cage from first sides of first guide recess parts to second sides in accordance with an embodiment of the present invention. FIG. 2 is a front sectional view illustrating the balls moved to second grooves in accordance with an embodiment of the present invention. FIG. 3 is a side sectional view illustrating the balls disposed in the second grooves in accordance with an embodiment of the present invention. FIG. 4 is a perspective view illustrating a state in which the balls have been disposed in the second grooves and an angle difference has occurred, in accordance with an embodiment of the present invention. FIG. 5 is a front sectional view illustrating the balls moved to first grooves in accordance with an embodiment of the present invention. FIG. 6 is a side sectional view illustrating the balls disposed in the first grooves in accordance with an embodiment of the present invention. FIG. 7 is a perspective view illustrating the balls disposed in the first grooves in accordance with an embodiment of the present invention. FIG. 8 is a diagram illustrating the shape of a second groove in accordance with an embodiment of the present invention. FIG. 9 is a diagram illustrating the shape of a second groove in another embodiment of the present invention. FIG. 10 is a diagram illustrating the shape of a second groove in accordance with yet another embodiment of the present invention. FIG. 11 is a perspective view illustrating an operation in which the balls move from the second grooves to the first grooves, trace an original point, and then enter an engaged state in accordance with an embodiment of the present invention. FIG. 12 is a front view illustrating the operation in which the balls move from the second grooves to the first grooves, trace the original point, and then enter the engaged state in accordance with an embodiment of the present invention. FIG. 13 is a perspective view illustrating the balls moved to respective outer sides of the second grooves in accordance with an embodiment of the present invention.

As shown in FIGS. 1 to 4, the clutch apparatus 1 for the stabilizer in accordance with an embodiment of the present invention may include an inner race 30, a housing 40, balls 70, and a driver 80. The inner race 30 is fixed to a first transmission bar 10, and first guide recess parts 34 are formed in a longitudinal direction D in an outer surface of the inner race 30. The housing 40 is fixed to a second transmission bar 20 and formed in a shape enclosing an outer surface of the inner race 30, and second guide recess parts 46 are formed in the housing 40 at positions facing the respective first guide recess parts 34. The balls 70 are disposed between the inner race 30 and the housing 40, and opposite sides of the balls 70 are respectively inserted into and retained in the first guide recess parts 34 and the second guide recess parts 46. The driver 80 is disposed inside the housing 40 and configured to move the balls 70 along the first guide recess parts 34 and the second guide recess parts 46 and thus control power transmission between the inner race 30 and the housing 40.

The clutch apparatus 1 for the stabilizer in accordance with the embodiment of the present invention is directed to a clutch structure which is used for power transmission or power interruption. The clutch apparatus 1 provides a structure making it possible to perform power transmission in such a way that related parts engage with each other after tracing an original point using the balls 70 and the second guide recess parts 46. In an engagement operation which is performed in such a way that the balls 70 move along the second grooves 48 and then are interposed between the first guide recess parts 34 and the first grooves 47, because only force needed to move the balls 70 is required, force required for performing the operation may be comparatively reduced. The clutch apparatus 1 for the stabilizer having the above-mentioned configuration may be used not only as a clutch for a stabilizer apparatus but also as a clutch for other power transmission apparatuses.

As shown in FIG. 2, the first transmission bar 10 is disposed at a first side (a left side based on FIG. 2) of the clutch apparatus 1 for the stabilizer, and the second transmission bar 20 is disposed at a second side (a right side based on FIG. 2) thereof. In accordance with an embodiment, the first transmission bar 10 may be a first stabilizer bar, and the second transmission bar 20 may be a second stabilizer bar.

The inner race 30 is fixed to the first transmission bar 10, and the first guide recess parts 34 are formed in the longitudinal direction D in the outer surface of the inner race 30. The inner race 30 in accordance with an embodiment may include an inner body 32 and the first guide recess parts 34. The inner body 32 is installed in a shape enclosing an end of the first transmission bar 10. The inner body 32 has a pipe shape. Each of the first guide recess parts 34 formed in the outer surface of the inner body 32 defines a linear depression extending in the longitudinal direction D of the inner body 32. The plurality of first guide recess parts 34 are arranged along a circumferential direction in the outer surface of the inner body 32.

The inner race 30 is installed in a shape facing the housing 40 coupled to the second transmission bar 20 and configured such that transmission of torque is performed in a state in which the balls 70 has been moved to an engagement position.

The housing 40 is fixed to the second transmission bar 20 and installed in a shape enclosing the outer surface of the inner race 30. The second guide recess parts 46 are formed in the housing 40 at positions facing the respective first guide recess parts 34. Each of the second guide recess parts 46 includes a first groove 47 which defines a linear depression identical with that of the first guide recess part 34, and a second groove 48 which defines a depression having a cross-sectional area greater than that of the first groove 47. When the balls 70 are in the second grooves 48, the housing 40 and the inner race 30 are not synchronized. When the balls 70 are disposed in the first grooves 47, the housing 40 and the inner race 30 are synchronized with each other, thus making power transmission possible. The housing 40 in accordance with an embodiment may include a fixing body 42, an extension body 44, and the second guide recess parts 46.

The fixing body 42 is fixed to the second transmission bar 20. The extension body 44 extends from the fixing body 42 and is installed in a shape enclosing the inner race 30. The second guide recess parts 46 are formed in an inner surface of the extension body 44 so that the balls 70 are guided to the engagement position or a disengagement position by the second guide recess parts 46. Each of the second guide recess parts 46 in accordance with an embodiment may include the first groove 47 and the second groove 48.

Each first groove 47 defines a linear depression formed at a position facing the corresponding first guide recess part 34. The first grooves 47 are formed in the inner surface of the housing 40 that faces the first guide recess parts 34. The first guide recess parts 34 and the first grooves 47 define linear grooves extending in the longitudinal direction D of the housing 40. Because inner surfaces of the first grooves 47 and the first guide recess parts 34 that face the balls 70 have curved shapes, the first grooves 47 and the first guide recess parts 34 come into surface contact with the balls 70. Therefore, the balls 70 that are interposed between the first grooves 47 and the first guide recess parts 34 may selectively come into surface, line or point contact with the inner race 30 and the housing 40, thus facilitating the power transmission.

Each second groove 48 is connected to the corresponding first groove 47 and defines a fan-shaped groove, so that the ball 70 that is disposed in the second groove 48 is allowed to move in a circumferential direction C. Furthermore, guide holes 87 are formed in the circumferential direction C in the cage 85 that moves the balls 70. Thus, the cage 85 and the housing 40 can rotate along with the second transmission bar 20 in the circumferential direction C. Therefore, in the case where the balls 70 are disposed in the second grooves 48, even though the first transmission bar 10 and the second transmission bar 20 rotate in different directions, the power of the housing 40 is not transmitted to the inner race 30 via the balls 70. While the balls 70 are locked in the first grooves 47 and the first guide recess parts 34, power transmission between the inner race 30 and the housing 40 can be performed via the balls 70.

The balls 70 are disposed between the inner race 30 and the housing 40, and each ball 70 has a bead shape, the opposite sides of which are respectively inserted into and retained in the first and second guide recess parts 34 and 46. The balls 70 are inserted into the respective guide holes 87 formed in the cage 85 of the driver 80, so that when the cage 85 moves in the longitudinal direction D, the balls 70 are also moved along with the cage 85. Because the balls 70 move along the respective second guide recess parts 46, frictional force generated when the inner race 30 and the housing 40 engage with each other at the original point may be reduced.

The driver 80 may be embodied using any one of various driving devices within the technical idea of the present invention in which it is disposed inside the housing 40 and controls power transmission between the inner race 30 and the housing 40 by moving the balls 70 along the first and second guide recess parts 34 and 46. The driver 80 in accordance with an embodiment may include a motor 81, a ball screw 83, a ball nut 84, the cage 85, and a compressing member 88.

The motor 81 employs an electric motor and is fixed in the fixing body 42. The fixing body 42 has a pipe shape, and the second transmission bar 20 is inserted into and fixed in an end of the fixing body 42. The motor 81 is inserted into and fixed in the internal space of the fixing body 42 that faces the second transmission bar 20.

The ball screw 83 is coupled to an output shaft 82 of the motor 81 and rotated by the operation of the motor 81, thus linearly moving the ball nut 84.

The ball nut 84 functions to convert the rotation of the ball screw 83 into linear motion. The ball nut 84 in accordance with an embodiment may be linearly moved while engaging with the ball screw 83, and be stopped by the inner surface of the extension body 44 so that the rotation thereof is restrained. The ball nut 84 has on an inner surface thereof an internal thread corresponding to an external thread provided on an outer surface of the ball screw 83.

The cage 85 extends from the ball nut 84 and is disposed between the extension body 44 and the inner race 30. The cage 85 has therein the guide holes 87 into which the respective balls 70 are inserted. The cage 85 and the ball nut 84 may be integrally formed, or may be produced as separate parts and then assembled and coupled with each other.

Each guide hole 87 has a slot shape, and the plurality of guide holes 87 are arranged along the circumferential direction of the cage 85. The cage 85 extending from the ball nut 84 is installed in a shape enclosing the outer surface of the inner race 30. A guide protrusion 86 extending in the longitudinal direction D of the cage 85 protrudes from the outer surface of the cage 85. The guide protrusion 86 is inserted into a guide groove 45 formed in the housing 40 so that the cage 85 is prevented from rotating in the circumferential direction C while the cage 85 is allowed to move in the longitudinal direction D. In addition, the guide holes 87 into which the respective balls 70 are inserted are formed in the first side of the cage 85.

In this embodiment of the present invention, there is illustrated an example where the circumferential rotation of the cage 85 is restrained by the configuration in which the groove is formed in the housing 40 and the protrusion is provided on the outer surface of the cage 85. Furthermore, a configuration in which the protrusion is provided on the housing 40 and the groove is formed in the outer surface of the cage 85 so that the circumferential rotation of the cage 85 is restrained may also fall within the bounds of embodiments of the present invention.

The compressing member 88 may be embodied using any one of various elastic members within the technical idea of the present invention in which it is disposed inside the housing 40 and elastically compresses the ball nut 84 toward the inner race 30. The compressing member 88 in accordance with an embodiment may employ a coil spring. A first side of the compressing member 88 is supported on the ball nut 84, and a second side of the compressing member 88 is supported on the inner surface of the housing 40. Therefore, when the ball nut 84 is moved toward the inner race 30, the load of the motor 81 may be reduced. Even when operational malfunction of the motor 81 is caused, the compressing member 88 may pushes the ball nut 84 toward the inner race 30 so that the balls 70 can be moved toward the first grooves 47.

On the other hand, when the cage 85 is moved toward the motor 81, the balls 70 are moved from the first grooves 47 to the second grooves 48, so that power transmission is interrupted. The ball nut 84 along with the cage 85 is moved toward the motor 81 while compressing the compressing member 88, and then is locked to a separate locking device so that the movement thereof is restrained. If the separate locking device is not provided, the motor 81 should be continuously operated to generate torque by which the ball nut 84 is moved.

Meanwhile, depending on the shape of a groove side-surface 49, 52, or 62 formed in the second grooves 48, 50, or 60, the magnitude of force for moving the ball 70 is changed. In the case where, as shown in FIG. 8, the first groove 47 and the second groove 48 are successively connected with each other and the groove side-surface 49 of the second groove 48 diagonally extends in a linear direction, it is assumed that the ball 70 can be moved along the second groove 48 by force set to an average degree.

FIG. 9 is a diagram illustrating the shape of the second groove in another embodiment of the present invention. As shown in FIG. 9, if the groove side-surface 52 of the second groove 50 is formed in a shape which is concave toward the inner side of the housing 40, compared to the case where the groove side-surface 49 is a planar surface, the magnitude of force needed to move the ball 70 at an initial stage is reduced, while the magnitude of force needed to move the ball 70 at a last stage is increased.

FIG. 10 is a diagram illustrating the shape of the second groove in accordance with yet another embodiment of the present invention. As shown in FIG. 10, if the groove side-surface 62 of the second groove 60 protrudes in a shape which is convex toward the inner side of the housing 40, compared to the case where the groove side-surface 49 is linear, the magnitude of force needed to move the ball 70 at an initial stage is increased, while the magnitude of force needed to move the ball 70 at a last stage is reduced.

The clutch apparatus 1 for the stabilizer is directed to a device in which the movement of the balls 70 is used to embody the engagement or disengagement of the related parts. Consequently, the friction generated during the operation of the apparatus may be minimized due to operational characteristics of the balls 70, and it is possible that force needed to move the balls 70 is adjusted by modifying the shapes of the second grooves 48.

Hereinafter, the operation of the clutch apparatus 1 for the stabilizer in accordance with an embodiment of the present invention will be described in detail with reference to the accompanying drawings.

As shown in FIGS. 1 to 4 and 11, in a state in which the balls 70 have been moved to the second side ends of the second groove 48, power is not transmitted between the inner race 30 and the housing 40. Because each second groove 48 defines a fan-shaped groove and the guide holes 87 each having a slot shape are formed in the cage 85, the balls 70 are allowed to move in the circumferential direction C.

If, as shown in FIG. 13, the inner race 30 guides the balls 70 toward the outer sides of the second grooves 48, the inner race 30 is allowed to rotate at 360 degrees based on the first transmission bar 10 because there is no structure of blocking rotation of the balls 70.

In the clutch apparatus 1 for the stabilizer in accordance with an embodiment of the present invention, the inner race 30 may be fixed to the first transmission bar 10, and the second transmission bar 20 may be fixed to the housing 40, but the present invention is not limited thereto. For example, the housing 40 may be fixed to the first transmission bar 10, and the second transmission bar 20 may be fixed to the inner race 30.

As shown in FIGS. 5 to 7, to enable power to be transmitted between the inner race 30 and the housing 40, the motor 81 is operated so that the ball screw 83 is rotated. Then, the ball nut 84 is moved toward the inner race 30 by the rotation of the ball screw 83.

Thereby, the cage 85 coupled to the ball nut 84 is moved, thus moving the balls 70 from the second grooves 48 to the first grooves 47. In this case, power transmission between the inner race 30 and the housing 40 is allowed via the balls 70 that have been moved to the first side ends of the first grooves 47.

Because each of the first grooves 47 formed in the housing 40 defines a linear groove, torque transmission is possible without large axial force in a state in which the balls 70 have completely engaged with the first grooves 47 and the first guide recess parts 34.

When, as shown in FIGS. 11 and 12, the balls 70 are in the respective second grooves 48, the balls 70 do not correspond to the original position. From this state, an operation of moving the balls 70 to the respective first grooves 47 by movement of the cage 85 is performed so that the balls 70 enter the engaged state corresponding to the original position. In other words, in the clutch apparatus 1 for the stabilizer, because mechanical original position compensation is possible, there is no need for a separate part such as a synchronizer. Therefore, the production cost may be reduced.

Furthermore, in the clutch apparatus 1 for the stabilizer, when connection for power transmission using the clutch or disconnection thereof is performed, it is possible that engagement operation is performed simultaneously with original position compensation. Particularly, the engagement operation with minimized friction is possible by using the balls 70. Thus, the capacity of the motor 81 may be reduced, whereby the production cost may be reduced.

In addition, the clutch apparatus 1 for the stabilizer is disposed between the first transmission bar 10 and the second transmission bar 20 and functions to interrupt power transmission when there is no need for power transmission. In other words, when the vehicle moves straight ahead, the clutch apparatus 1 enters the disengaged state, and, when the vehicle turns, the clutch apparatus 1 enters the engaged state, thus enhancing ride comfort and turning stability.

As described above, in accordance with the present invention, the clutch operation in which the balls 70 move from the second grooves 48 each having a fan shape to the first grooves 47 each having a linear shape to trace the original point and then enter the engaged state can be rapidly and easily performed. Furthermore, when the vehicle moves straight ahead, the balls 70 move to the second grooves 48 so that the power transmission between the housing 40 and the inner race 30 is interrupted. When the vehicle turns, the balls 70 move to the first grooves 47 so that the power transmission between the housing 40 and the inner race 30 is allowed. Therefore, the ride comfort and the turning stability can be enhanced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A clutch apparatus for a stabilizer, comprising:
   an inner race fixed to a first transmission bar, with a first guide recess defined in a longitudinal direction in an outer surface of the first transmission bar;
   a housing fixed to a second transmission bar and installed in a shape enclosing the outer surface of the inner race, with a second guide recess defined in the housing at a position facing the first guide recess;
   a ball disposed between the inner race and the housing and is configured to have opposite sides respectively inserted into and retained in the first guide recess and the second guide recess; and
   a driver disposed inside the housing and configured to move the ball along the first guide recess and the second guide recess and control power transmission between the inner race and the housing,
   wherein:
   the inner race comprises an inner body installed in a shape enclosing an end of the first transmission bar; and
   the first guide recess formed in the outer surface of the inner body defines a linear groove extending along a longitudinal direction of the inner body.

2. The clutch apparatus of claim 1, wherein the first guide recess comprises a plurality of first guide recesses arranged along a circumference of the outer surface of the inner body.

3. The clutch apparatus of claim 2, wherein the housing comprises:
   a fixing body fixed to the second transmission bar; and
   an extension body extending from the fixing body and installed in a shape enclosing the inner race, with the second guide recess defined in an inner surface of the extension body.

4. The clutch apparatus of claim 3, wherein the second guide recess comprises:
   a first groove defining a linear groove at a position facing the first guide recess; and
   a second groove connected with the first groove and defining a fan-shaped groove,
   wherein, while the ball is locked in the first groove and the first guide recess, power transmission between the inner race and the housing is performed through the ball.

5. The clutch apparatus of claim 4, wherein a magnitude of force for moving the ball varies depending on a shape of a groove side-surface of the second groove.

6. The clutch apparatus of claim 5, wherein the groove side-surface of the second groove protrudes in a convex shape toward an inside of the housing.

7. The clutch apparatus of claim 5, wherein the groove side-surface of the second groove is formed in a concave shape toward an inside of the housing.

8. The clutch apparatus of claim 3, wherein the driver comprises:
   a motor fixed in the fixing body;
   a ball screw coupled to an output shaft of the motor and configured to be rotated by operation of the motor;
   a ball nut configured to be locked to the inner surface of the extension body to restrain the ball nut from rotating, the ball nut is configured to engage with the ball screw and linearly move; and a cage extending from the ball nut and disposed between the extension body and the inner race, and comprising a guide hole, the guide hole is defined to have the ball inserted therein.

9. The clutch apparatus of claim 8, wherein the guide hole has a slot shape and comprises a plurality of guide holes arranged in a circumferential direction of the cage.

10. The clutch apparatus of claim 8, wherein the driver further comprises a compressing member disposed inside the housing and configured to elastically compress the ball nut toward the inner race.

* * * * *